(12) United States Patent
Wagner et al.

(10) Patent No.: US 9,738,190 B2
(45) Date of Patent: Aug. 22, 2017

(54) HEAD RESTRAINT FOR A VEHICLE SEAT

(71) Applicant: Ford Global Technologies, LLC, Dearborn, MI (US)

(72) Inventors: Uwe Wagner, Wermelskirchen (DE); Carsten Schauf, Leichlingen (DE); Kilian Vas, Cologne (DE); Daniel Hari, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 60 days.

(21) Appl. No.: 14/718,275

(22) Filed: May 21, 2015

(65) Prior Publication Data

US 2015/0336488 A1  Nov. 26, 2015

(30) Foreign Application Priority Data

May 23, 2014 (DE) .................. 10 2014 209 888

(51) Int. Cl.
*B60N 2/20* (2006.01)
*B60N 2/48* (2006.01)

(52) U.S. Cl.
CPC .......... *B60N 2/4882* (2013.01); *B60N 2/20* (2013.01); *B60N 2/4808* (2013.01); *B60N 2/4855* (2013.01); *B60N 2002/4891* (2013.01)

(58) Field of Classification Search
CPC ...... B60N 2/4882; B60N 2/20; B60N 2/4855; B60N 2002/4891
USPC ....................... 297/403, 408, 410
See application file for complete search history.

(56) References Cited

U.S. PATENT DOCUMENTS

| | | | | |
|---|---|---|---|---|
| 344,726 | A | * 6/1886 | Dolton | B60N 2/487 |
| | | | | 297/403 |
| 4,288,330 | A | 9/1981 | Strub | |
| 5,370,446 | A | * 12/1994 | Bancod | A47C 7/38 |
| | | | | 297/220 |
| 5,531,505 | A | * 7/1996 | Baetz | B60N 2/4847 |
| | | | | 297/408 |
| 5,904,405 | A | * 5/1999 | Wu | B60N 2/4817 |
| | | | | 297/216.12 |
| 5,997,091 | A | * 12/1999 | Rech | B60N 2/4838 |
| | | | | 297/217.3 |
| 6,113,192 | A | * 9/2000 | Schneider | B60N 2/487 |
| | | | | 297/403 |
| 6,120,099 | A | 9/2000 | Reikeras et al. | |

(Continued)

FOREIGN PATENT DOCUMENTS

| | | | | |
|---|---|---|---|---|
| CA | 2915355 | A1 * 12/2013 | ........... | B60N 2/4879 |
| DE | 19653516 | A1 * 6/1997 | ........... | B60N 2/4808 |

(Continued)

*Primary Examiner* — Timothy J Brindley
(74) *Attorney, Agent, or Firm* — Vichit Chea; Price Heneveld LLP

(57) ABSTRACT

A head restraint for a vehicle seat, includes a central part having a front surface, an upper side and opposing side surfaces. First and second side parts are operably coupled to the opposing side surfaces of the central part and are operable between supporting and non-supporting positions relative to the central part. The first and second side parts each include first and second limbs which are flexibly coupled to one another, wherein portions of the first and second side parts protrude outwardly relative to the front surface of the central part when the first and second side parts are in the supporting position.

16 Claims, 4 Drawing Sheets

(56) References Cited

U.S. PATENT DOCUMENTS

| | | | |
|---|---|---|---|
| 6,220,668 B1 | 4/2001 | Scheffzuck | |
| 7,364,239 B2 * | 4/2008 | Clough | A47C 7/38 297/391 |
| 7,413,253 B2 * | 8/2008 | Karlberg | B60N 2/4844 297/391 |
| 7,866,748 B2 * | 1/2011 | Pos | B60N 2/2851 297/250.1 |
| 8,128,162 B2 * | 3/2012 | Gerhardt | B60N 2/4613 297/112 |
| 8,616,625 B2 * | 12/2013 | Buccinna | B60N 2/3011 297/408 |
| 8,746,799 B2 * | 6/2014 | Dumont | B60N 2/3013 297/403 |
| 9,446,694 B2 * | 9/2016 | Szczygiel | B60N 2/4882 |
| 2009/0218874 A1 * | 9/2009 | Meiller | B60N 2/4817 297/408 |
| 2010/0141008 A1 * | 6/2010 | Augade | B60N 2/4882 297/408 |
| 2010/0244526 A1 * | 9/2010 | Kajimoto | B60N 2/4808 297/354.1 |
| 2011/0254339 A1 * | 10/2011 | Bruck | B60N 2/4855 297/403 |
| 2012/0139309 A1 * | 6/2012 | Gaither | B60N 2/4879 297/220 |
| 2013/0207439 A1 * | 8/2013 | Rezbarik | B60N 2/4808 297/408 |
| 2014/0339875 A1 * | 11/2014 | Sunaga | B60N 2/4838 297/408 |
| 2015/0197170 A1 * | 7/2015 | Obukhov | B60N 2/4882 297/391 |
| 2015/0375652 A1 * | 12/2015 | Scolari | B60N 2/4808 297/188.01 |
| 2016/0130003 A1 * | 5/2016 | Arriola | B60N 2/4879 297/397 |

FOREIGN PATENT DOCUMENTS

| | | | | |
|---|---|---|---|---|
| DE | 10209187 C1 * | 8/2003 | | B60N 2/4882 |
| DE | 10241132 A1 * | 3/2004 | | B60N 2/4876 |
| DE | 102004058788 | 6/2006 | | |
| DE | 102007041034 A1 * | 3/2009 | | B60N 2/4882 |
| DE | 102009021267 A1 * | 11/2010 | | B60N 2/4808 |
| DE | 202011051657 U1 * | 10/2012 | | B60N 2/4882 |
| DE | 102014206145 A1 * | 10/2015 | | B60N 2/4832 |
| DE | 102014219867 A1 * | 3/2016 | | B60N 2/4838 |
| EP | 3031665 A1 * | 6/2016 | | B60N 2/4882 |
| FR | 2917683 A1 * | 12/2008 | | B60N 2/4882 |
| GB | 2415616 A * | 1/2006 | | B60N 2/4855 |
| JP | WO 2010010748 A1 * | 1/2010 | | B60N 2/4882 |
| JP | WO 2013099450 A1 * | 7/2013 | | B60N 2/4817 |
| TW | DE 19931391 A1 * | 1/2000 | | B60N 2/4838 |

* cited by examiner

HEAD RESTRAINT FOR A VEHICLE SEAT

CROSS-REFERENCE TO RELATED APPLICATION

This application claims priority to DE 102014209888.2, filed on May 23, 2014, the entire contents of which are hereby incorporated herein by reference.

FIELD OF THE INVENTION

The present invention relates to a head restraint for a vehicle seat, and more particularly, to a head restraint having side parts operable between supporting and non-supporting positions.

BACKGROUND OF THE INVENTION

Side parts on head restraints of this type are used, when a vehicle occupant is resting and sleeping, to secure the vehicle occupant's head against slipping off the head restraint.

A head restraint of this type is disclosed, for example, in U.S. Pat. No. 6,220,668. The head restraint comprises a central head cushion part and two side parts which are assigned to the head cushion part, protrude laterally on the central head cushion part over the front of the cushion in the use position and, in the non-use position thereof, are pivotable into the contour of the central head cushion part. The two side parts are pivotable mirror-symmetrically with respect to the vertical center line of the central head cushion and, in the non-use position, cover the rear side of the central head cushion part.

Furthermore, a head restraint for a vehicle seat with a front surface and two side surfaces is known from U.S. Pat. No. 6,120,099, wherein the head restraint has two elements which are extendable out of the side surfaces and, at the beginning, are completely accommodated in the head restraint, but are designed in order to move with a sliding movement into an extended position. The elements then extend laterally relative to the head restraint and, furthermore, forward relative to the head restraint where they form an additional support for the head of a passenger in the seat.

German Patent Application No. DE10 2004 058 788A1 describes a vehicle seat with a head restraint, wherein the head restraint has at least one pivotable cushion part. In order to make comfortable adjustment of the head restraint possible, it is provided that, in the cushion part, a bubble fillable with a fluid is arranged between cushion carrier and cushion part for the pivoting of the cushion part.

Furthermore, a vehicle seat with a head restraint and two side supports is known from German Patent No. GB 2,415,616A, wherein said side supports are arranged pivotably on a backrest of the vehicle seat in order to support the side of a head of a vehicle occupant sitting on the vehicle seat. The side supports can be pivoted into different use positions, as a result of which they can be adapted to different heights of the vehicle occupants.

Against this background, the present invention is based on the object of providing a head restraint for a vehicle seat with a compact minimum size and aesthetically attractive shaping, and which, furthermore, is comfortable and secure. In addition, the head restraint is intended to be simple to operate and to be usable universally. Furthermore, a vehicle seat with a corresponding head restraint is intended to be provided, the vehicle seat also profiting from an optimized overall size of the head restraint.

This object is achieved by a head restraint with the features as claimed, and by a vehicle seat with the features as claimed.

It should be emphasized that the features specified individually in the claims can be combined with one another in any technically expedient manner and depict further refinements of the invention. The description characterizes and specifies the invention, in particular additionally in conjunction with the figures.

According to the invention, a head restraint for a vehicle seat comprises a central part, a fastening means and at least one side part. The fastening means is designed in order to fasten the central part to a backrest of the vehicle seat. The central part and the side part are preferably padded. Furthermore, in a supporting position, the side part protrudes laterally on the central part over the front surface thereof and, in a non-supporting position, is received into the contour of the central part.

According to the invention, the side part is attached to a side surface of the central part so as to be displaceable parallel to said side surface.

Within the context of the present invention, the front surface of the central part should be understood as meaning that surface which faces a front of the vehicle when the head restraint is installed in the vehicle. Accordingly, the side surface of the central part faces one side of the vehicle. The front surface of the central part serves essentially rearwardly to support the head of a vehicle occupant on the vehicle seat, whereas the side part, in the supporting position thereof, prevents the vehicle occupant's head from slipping laterally off the central part.

In the non-supporting position thereof, the side part is preferably received into the contour of the central part, that is to say, the front surface of the side part is substantially aligned with the front surface of the central part, and therefore the central part and the side part from a common front surface of the head restraint. Accordingly, the central part can be configured, in particular in respect of the width thereof, to a compact minimum size, but, nevertheless, secure supporting of the vehicle occupant's head is ensured both in the supporting position of the side part and in the non-supporting position thereof. In addition, the integration of the side part in the non-supporting position thereof into the contour of the central part realizes a uniform head restraint which is provided with aesthetically attractive outer surfaces and can easily be adapted to the interior design of the vehicle.

The displaceability of the side part parallel to the side surface of the central part constitutes, for the vehicle occupant, an intuitive handling for adjusting the side part between the supporting position and the non-supporting position. Particular knowledge, complicated maneuvers or additional tools are advantageously not required for adjusting the side part. In addition, objects present in the immediate lateral or rear vicinity of the head restraint in the vehicle, for example pieces of luggage or items of clothing deposited on a rear parcel shelf of the vehicle, are not able to obstruct the displacement of the side part between the supporting position thereof and the non-supporting position thereof, as could be the case, for example, during the lateral pivoting of the side part behind the central part, and this makes the handling of the head restraint even more convenient for the vehicle occupant.

According to an advantageous refinement of the invention, the side part is of substantially L-shaped design and is flexible. In this case, preferably one end of the L-shaped side part is attached pivotably to the side surface of the central part, whereas the other end of the L-shaped side part is attached in a longitudinally displaceable manner to the side surface of the central part. Accordingly, during the displacement from the non-supporting position into the supporting position, the two limbs of the L-shaped side part are slightly bent toward each other. This relative movement of the two limbs is compensated for by the flexibility of the side part substantially at the connecting point of the two limbs of the side part, by said connecting point yielding and being somewhat compressed. The compression generates a spring force which is opposed to the forced relative movement of the two limbs. This spring force can be used in turn to clamp the side part in the supporting position because of the frictional force occurring in the longitudinally displaceable mounting of the one limb on the side surface of the central part, and therefore an additional locking mechanism does not have to be provided for holding the side part in the supporting position.

In a further advantageous refinement of the invention, the central part is of substantially L-shaped design, wherein one limb of the L-shape corresponds to an upper side of the central part and the other limb corresponds to the front surface of the central part. The upper side of the central part should be understood as meaning that side or surface which faces an upper side of the vehicle, that is to say the roof of the vehicle, when the head restraint is installed in the vehicle. Accordingly, the central part of the head restraint can be adapted in a space-saving manner to the contour of the backrest of the vehicle seat, as a result of which a particularly compact arrangement of the head restraint and of the vehicle seat can be realized.

According to yet another advantageous refinement of the invention, the fastening means is designed in order to mount the central part pivotably relative to the backrest about a horizontal pivot axis between at least one use position and a non-use position. For example, the central part is pivotable about the horizontal pivot axis within an angular range of approximately 180 degrees. In the supporting position, the central part preferably substantially forms an extension of the backrest. In the non-use position, the central part is folded down in the direction of the rear of the vehicle by pivoting. By this means, firstly, the installation of any type of child seat on the vehicle seat is facilitated, since the head restraint, in the folded-down non-use position thereof, cannot constitute any obstacle for the child seat, and, secondly, the rearward view of a vehicle driver is only slightly affected by the head restraint in the folded-down non-use position thereof.

In yet another advantageous refinement of the invention, the fastening means comprises two supporting struts on which the central part is pivotably mounted, and, in the region of the bearing points of the supporting struts on the central part, the central part in each case has a slot-like recess which extends from the respective bearing point as far as a rear side of the central part. The rear of the central part should be understood as meaning that side or surface which faces the rear of the vehicle in the use position of the head restraint. The recesses permit the unhindered pivoting of the central part between the use position and the folded-down non-use position.

According to a further advantageous refinement of the invention, the fastening means comprises means for adjusting the height of the head restraint. As a result, the latter can be adapted specifically to the vehicle occupants sitting on the vehicle seat and therefore improved head adjustment and optimized protection are ensured.

According to a further aspect, the invention comprises a vehicle seat with a backrest and a head restraint arranged thereon according to one of the refinements described above. By means of the above-described possibility of transferring the head restraint into a non-use position, an improved overall size of the vehicle seat can be achieved. In particular in the non-use position of the head restraint, the vehicle seat is presented in an overall more compact configuration since the head restraint has the smallest vertical extent with respect to the vehicle seat in the non-use position.

In a further advantageous refinement of the invention, the backrest of the vehicle seat can be folded down. For example, the vehicle seats of a vehicle, the backrest of which can be folded down, for example, for increasing the trunk space or for entry into the rear of the vehicle, are involved. If the head restraint of the vehicle seat is in the folded-down non-use position, then, in order to fold the vehicle seat down, less space is required in the interior of the vehicle than with the vehicle seat with the head restraint in the use position. Even for front seats which can be folded down, such a configuration is advantageous in respect of the view and the overall size for reasons mentioned above.

BRIEF DESCRIPTION OF THE DRAWINGS

Further features and advantages of the invention emerge from the description below of an exemplary embodiment, not to be understood as limiting, of the invention which is explained in more detail below with reference to the drawings, in which, schematically.

DETAILED DESCRIPTION OF THE PREFERRED EMBODIMENTS

Figure 1:
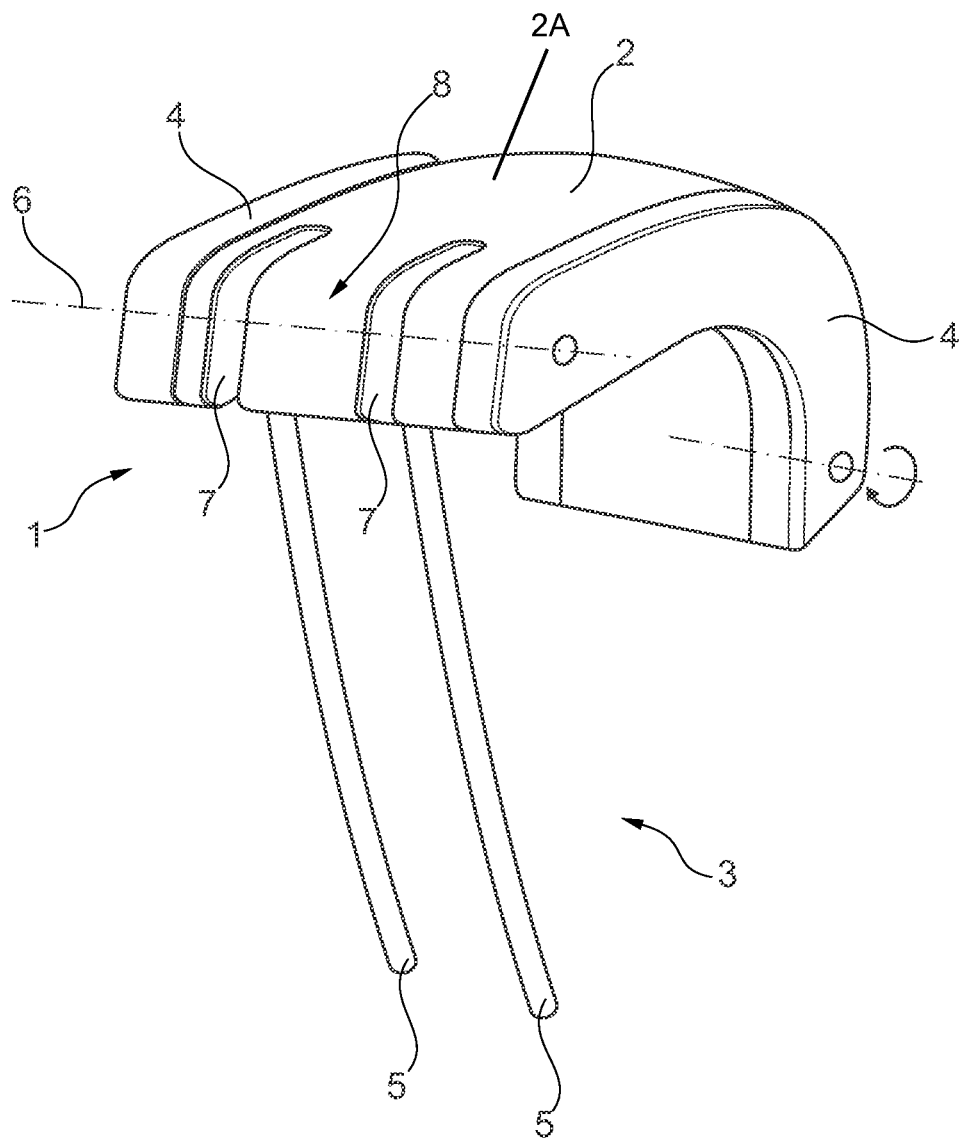
FIG. 1 is a rear perspective view of an embodiment of a head restraint according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In the various figures, parts which are equivalent in respect of the function thereof are always provided with the same reference numbers, and therefore said parts are generally also only described once.

FIG. 1 illustrates a perspective rear view of an embodiment of a head restraint 1 according to the invention for a vehicle seat (not illustrated in FIG. 1). The head restraint 1 comprises a central part 2 having an upper side 2A, a fastening means 3 for fastening the central part 2 to a backrest of the vehicle seat, and two side parts 4. The two side parts 4 are of identical design and are attached to the central part 2 in the same manner, and therefore the explanations here with regard to one side part 4, apply equally to the other side part 4. As can be gathered from FIG. 1, in the illustrated embodiment of the head restraint 1, the central part 2 and the two side parts 4 are of substantially L-shaped design. In addition, in the shown embodiment of the head restraint 1, the side parts 4 are of flexible design, as is explained in more detail below.

As can furthermore be gathered from FIG. 1, in the illustrated embodiment of the head restraint 1, the fastening means 3 comprises two supporting struts 5 on which the central part 2 is pivotably mounted. In order to permit an unobstructed pivoting movement of the central part 2 relative to the backrest of the vehicle seat about a horizontal pivot axis 6 between at least one use position and a non-use position of the head restraint 1, the central part 2 has a slot-shaped recess 7 in the region of each of the bearing points of the supporting struts 5 on the central part 2. As can be seen in FIG. 1, each recess 7 extends from the respective bearing point as far as a rear side 8 of the central part 2.

Figure 2:
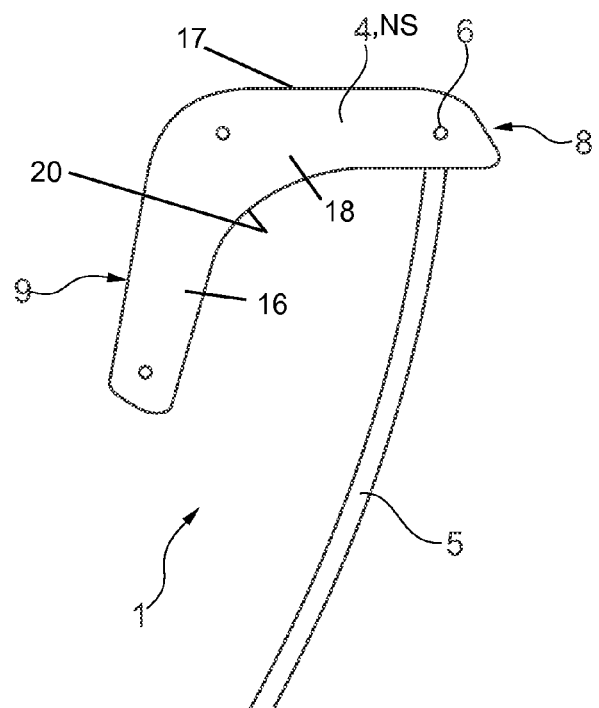
FIG. 2 is a side elevational view of the head restraint of FIG. 1 in a lateral non-supporting position.

FIG. 2 illustrates a side view of the head restraint 1 from FIG. 1 in a lateral non-supporting position. In said non-supporting position NS of the side part 4, the side part 4 is received into the contour of the central part 2. In other words, a front surface 9 of the side part 4 is disposed on a first limb 16 of the side part 4, which is aligned with a front surface 10 (visible in FIG. 3) of the central part 2, such that the central part 2 and the side part 4 form a common front surface of the head restraint 1, said common front surface being formed from the respective front surfaces 9 and 10 of said central part 2 and side parts 4. The front surfaces 9 and 10 serve together to support a vehicle occupant's head to the rear when the side part 4 is in this retracted position. A top surface 17 of side part 4 is disposed on a second limb 18 of the side part 4, as shown in FIG. 2.

Figure 3:
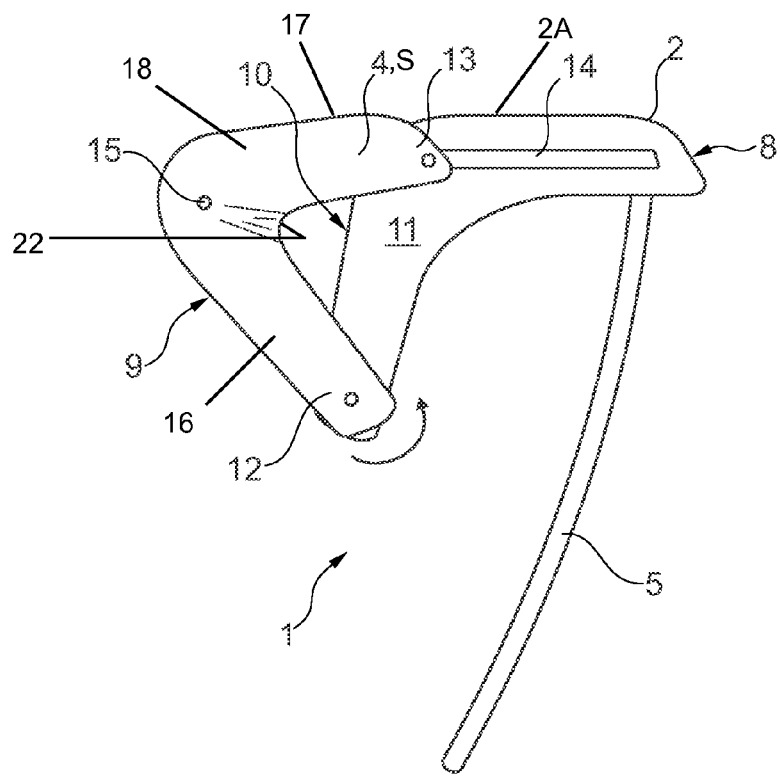
FIG. 3 is a side elevational view of the head restraint of FIG. 1 in a lateral supporting position.

FIG. 3 illustrates a side view of the head restraint 1 from FIG. 1 in a lateral supporting position. As can be seen in FIG. 3, the side part 4 of the head restraint 1 protrudes laterally on the central part 2 over the front surface 10 thereof in this deployed supporting position S. The side part 4, in the illustrated supporting position S thereof, therefore prevents the vehicle occupant's head from slipping laterally off the front surface 10 of the central part 2, and at the same time, provides protection for the head against a lateral dynamic effect. Furthermore, a side surface 11 of the central part 2, on which said side surface 11 the side part 4 is attached so as to be displaceable parallel to said side surface 11, can be seen in FIG. 3.

As has already been mentioned above, in the embodiment of the head restraint 1 illustrated in the figures, the central part 2 and the side parts 4 are of L-shaped design. It can furthermore be gathered from FIG. 3 that one end 12 of the L-shaped side part 4 is attached pivotably to the side surface 11 of the central part 2, whereas the other end 13 of the L-shaped side part 4 is attached in a longitudinally displaceable manner to the side surface 11 of the central part 2. For this purpose, the central part 2 has a corresponding longitudinal guide 14.

Since the side part 4 in the illustrated embodiment of the head restraint 1 shown in FIG. 3, as has already been mentioned, is of flexible design, the first and second limbs 16, 18 of the L-shaped side part 4 bend slightly toward each other during the displacement from the non-supporting position NS illustrated in FIG. 2, into the supporting position S illustrated in FIG. 3. This relative movement of the first and second limbs 16, 18 toward each other is compensated for by the flexibility of the side part 4 substantially at the connecting point 15 of the first and second limbs 16, 18 of the side part 4. Thus, an angle disposed between the first and second limbs 16, 18 is shown in FIG. 2 as a first angle 20. The first angle 20 is correspondingly reduced at the connecting point 15 to a second angle 22, shown in FIG. 3, which is less than first angle 20, shown in FIG. 2. Due to the flexibility of the side part 4, the connecting point 15 yields and is compressed as the side part moves from the non-supporting position NS (FIG. 2) to the supporting position S (FIG. 3). This compression generates a spring force which is opposed to the relative movement of the first and second limbs 16, 18, which relative movement is forced by the displacement movement of the end 13. Said spring force can be used in order to clamp the side part 4 in the supporting position S illustrated in FIG. 3 as a result of a frictional force occurring in the longitudinal guide 14. Therefore an additional locking mechanism does not have to be provided for holding the side part 4 in the supporting position S illustrated in FIG. 3.

Figure 4:
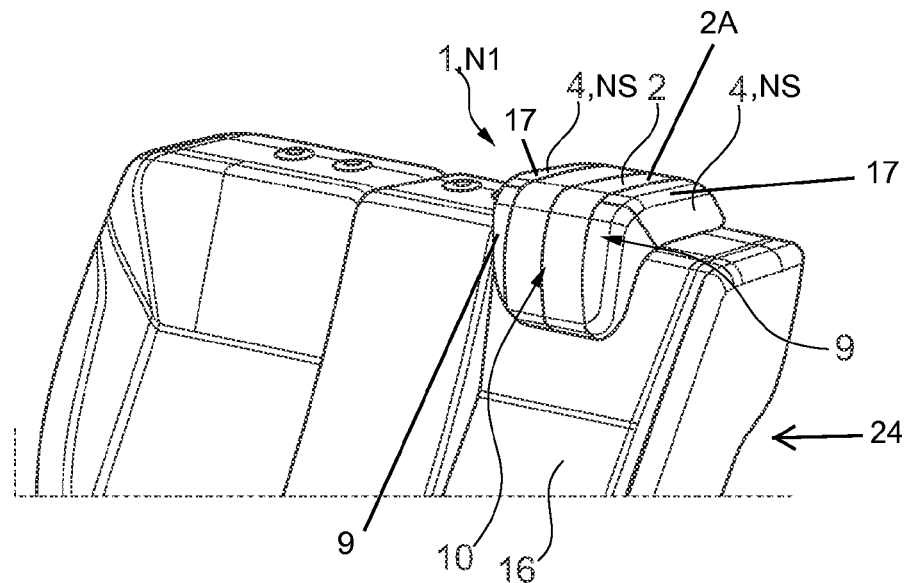
FIG. 4 is a front perspective view of the head restraint of FIG. 1, with the head restraint attached to a backrest of a vehicle seat, in a first non-use position.

FIGS. 4 to 7 illustrate perspective front views of the head restraint 1 from FIG. 1, wherein the head restraint 1 is attached to a backrest 16 of a vehicle seat 24, in various operating positions. FIG. 4 illustrates the head restraint 1 in a first non-use position N1 in which the supporting struts 5 (FIG. 1) of the fastening means 3 (FIG. 1), which supporting struts 5 are provided for attaching the head restraint 1 to the backrest 16 of the vehicle seat 24, are pushed substantially completely into the backrest 16, such that the head restraint 1 is in a lowered position relative to the backrest 16. The side parts 4 are in a non-supporting position and are received into the contour of the central part 2. In particular, the front surfaces 9 of the two side parts 4 and the front surface 10 of the central part 2 form a common front surface of the head restraint 1 here. In addition, by means of the L-shape of the central part 2 and of the side parts 4 of the head restraint 1, said parts match the contour of the backrest 16 in a substantially flush manner, thus resulting altogether in an optimized overall side of the vehicle seat which only slightly impairs the rearward view of a vehicle driver by means of the head restraint 1 in this non-use position N1.

Figure 5:
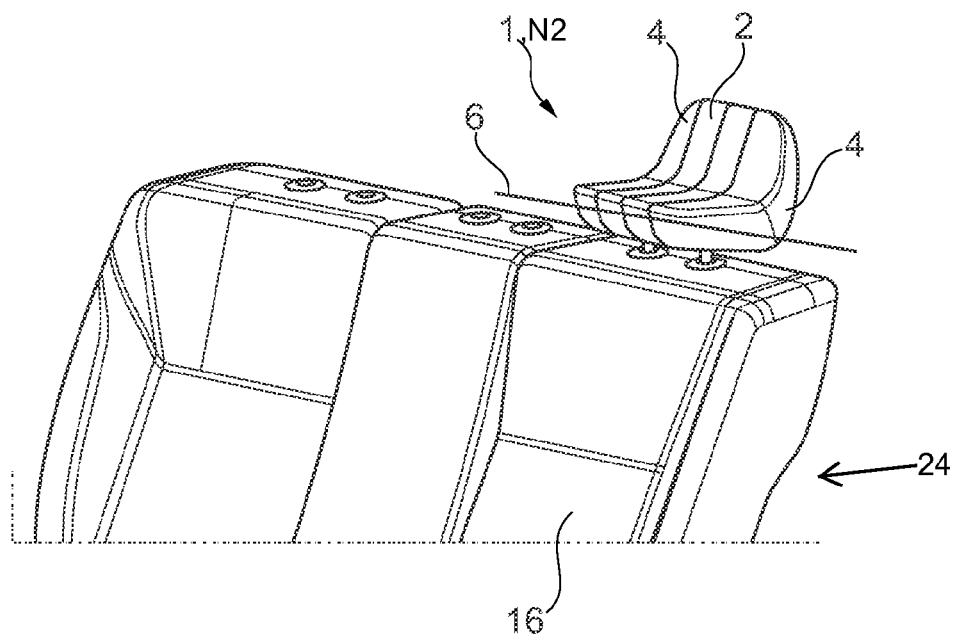
FIG. 5 is a front perspective view of the head restraint of FIG. 1, with the head restraint attached to a backrest of a vehicle seat, in a second non-use position.

FIG. 5 illustrates the head restraint 1 in a second non-use position N2, in which the central part 2 has been pivoted to the rear essentially by 180 degrees about the horizontal pivot axis 6 in comparison to the illustration of the head restraint 1 in FIGS. 4 and 5. This folded-down non-use position N2 of the head restraint 1 is particularly preferred when a child seat (not illustrated) is mounted on the vehicle seat 24 since the head restraint 1 in this folded-down non-use position N2 cannot constitute any obstacle for the child seat and the latter can therefore be mounted on the vehicle seat 24 without problems.

Figure 6:
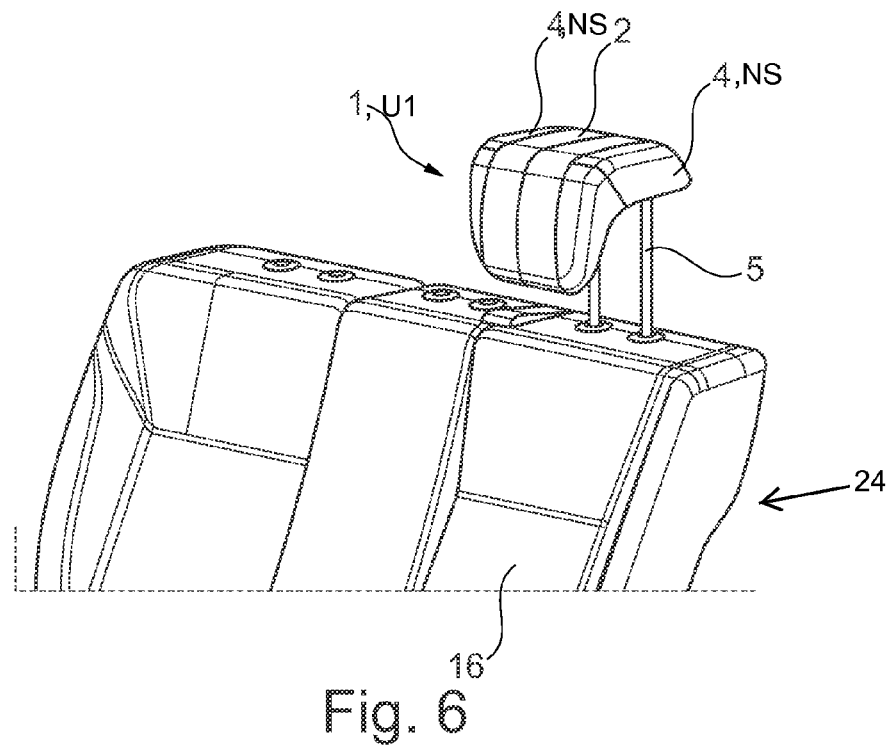
FIG. 6 is a front perspective view of the head restraint of FIG. 1, with the head restraint attached to a backrest of a vehicle seat, in a first use position.

FIG. 6 illustrates the head restraint 1 in a first use position U1, in which the supporting struts 5 accommodated in a height-adjustable manner in the backrest 16 are extended from the backrest 16, such that the head restraint 1 is in a raised position relative to the backrest 16. In the illustrated use position U1 of FIG. 6, the side parts 4 of the head restraint 1 are in a non-supporting position NS which has already been illustrated in FIG. 4 and explained in this connection. This use position U1 of the head restraint 1 is preferably used for supporting the head of an adult vehicle occupant.

Figure 7:
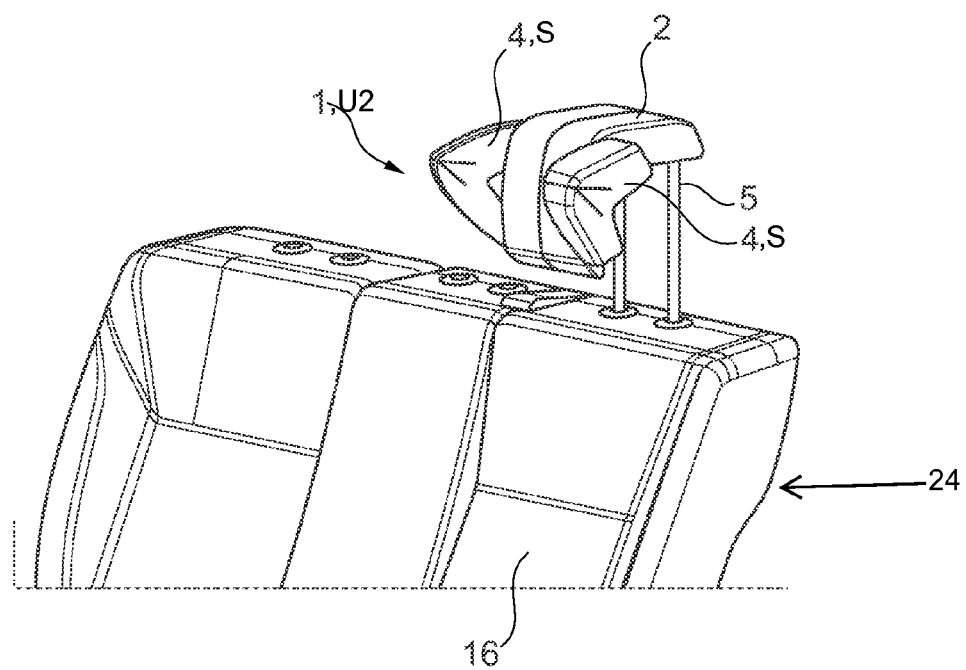
FIG. 7 is a front perspective view of the head restraint of FIG. 1, with the head restraint attached to a backrest of a vehicle seat, in a second use position with an additional lateral supporting position.

FIG. 7 illustrates the head restraint 1 in a second use position U2, in which the supporting struts 5 are extended from the backrest 16 and the side parts 4 are located in a lateral supporting position S which has already been illustrated in FIG. 5 and explained in this connection. This use position U2 of the head restraint 1 is preferably used for the lateral support of the head of an adult vehicle occupant.

The head restraint according to the invention has been explained in more detail with reference to an exemplary embodiment illustrated in the figures. However, the head restraint is not restricted to the embodiments described herein, but rather also comprises further embodiments of equivalent effect.

In a preferred embodiment, the head restraint according to the invention is used in a vehicle, in particular a motor vehicle, wherein the head restraint is arranged on a backrest of a vehicle seat mounted in the vehicle.

It will be appreciated by those skilled in the art that although the invention has been described by way of example with reference to one or more embodiments it is not limited to the disclosed embodiments and that alternative embodiments could be constructed without departing from the scope of the invention as defined by the appended claims. It will further be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A head restraint for a vehicle seat, the head restraint comprising:
   a central part having a front surface, at least one side surface and a contour; and
   at least one side part operably coupled to the at least one side surface of the central part so as to be displaceable parallel to the at least one side surface, the at least one side part operable between supporting and non-supporting positions, wherein the at least one side part protrudes forward from the central part past the front surface thereof in the supporting position, and further wherein the at least one side part aligns with the contour of the central part in the non-supporting position, wherein the at least one side part is flexible and includes first and second limbs disposed in a substantially L-shaped configuration and further wherein the first limb is pivotally coupled to the at least one side surface of the central part, and further wherein the second limb is attached in a longitudinally displaceable manner to the at least one side surface of the central part.

2. The head restraint claimed in claim 1, wherein the central part includes a substantially L-shaped configuration, and further wherein the first limb of the at least one side part corresponds to the front surface of the central part and the second limb of the at least one side part corresponds to an upper side of the central part.

3. The head restraint as claimed in claim 1, including:
   a fastening means for fastening the central part to a backrest of the vehicle seat, wherein the fastening means is configured to mount the head restraint in a pivotable manner relative to the backrest about a horizontal pivot axis between at least one use position and at least one non-use position.

4. The head restraint as claimed in claim 3, wherein the fastening means comprises two supporting struts on which the central part is pivotably mounted, and further wherein the central part includes two slot-like recesses configured to receive the two supporting struts when the head restraint is in the at least one non-use position.

5. The head restraint as claimed in claim 3, wherein the fastening means are configured to support the head restraint between raised and lowered positions relative to the backrest of the vehicle seat.

6. A vehicle seat, comprising:
   a backrest;
   a head restraint coupled to the backrest by fastening means, wherein the fastening means are configured to support the head restraint between raised and lowered positions, wherein the head restraint includes a central part having first and second side parts disposed on opposite side surfaces of the central part, and further wherein the first and second side parts each include first and second limbs which are flexibly coupled to one another, such that the first and second side parts are operable between deployed and retracted positions relative to the central part, wherein the first and second side parts are outwardly displaced from a front surface of the central part in the deployed position; and first and second longitudinal slots disposed on the opposite side surfaces of the central part, wherein the second limbs of the first and second side parts are slideably coupled to the first and second longitudinal slots, respectively, for displacing movement therewith as the first and second side parts move between the retracted and deployed positions and further wherein the first limbs of the first and second side parts are pivotally coupled to the opposite side surfaces of the central part, respectively.

7. The vehicle seat as claimed in claim 6, wherein the first limbs of the first and second side parts include front surfaces which are aligned with the front surface of the central part when the first and second side parts are in the retracted position.

8. The vehicle seat as claimed in claim 6, wherein the first and second side parts are flexible, and further wherein the first and second limbs are disposed in a substantially L-shaped configuration.

9. The vehicle seat as claimed in claim 8, wherein the first and second limbs of the first and second side parts are disposed at a first angle relative to one another when the first and second side parts are in the retracted position.

10. The vehicle seat as claimed in claim 9, wherein the first and second limbs of the first and second side parts are disposed at a second angle relative to one another when the first and second side parts are in the deployed position, and further wherein the second angle is less than the first angle.

11. The vehicle seat as claimed in claim 6, wherein the backrest is foldable.

12. A head restraint for a vehicle seat, the head restraint comprising:

a central part having a front surface, an upper side and opposing side surfaces with longitudinal slots disposed on each side surface;

first and second side parts slideably coupled to the longitudinal slots of the opposing side surfaces of the central part between supporting and non-supporting positions, wherein the first and second side parts each include first and second limbs which are flexibly coupled to one another, and further wherein portions of the first and second side parts protrude outwardly relative to the front surface of the central part when the first and second side parts are in the supporting position; and wherein the first limbs of the first and second side parts are pivotally coupled to opposing side surfaces of the central part, respectively, and further wherein the second limbs of the first and second side parts are attached in a longitudinally displaceable manner to the respective longitudinal slots of the central part on the opposing side surfaces of the central part.

13. The head restraint as claimed in claim 12, wherein the first and second limbs of the first and second side parts are disposed at a first angle relative to one another when the first and second side parts are in the non-supporting position.

14. The head restraint as claimed in claim 13, wherein the first and second limbs of the first and second side parts are disposed at a second angle relative to one another when the first and second side parts are in the supporting position, and further wherein the second angle is less than the first angle.

15. The head restraint as claimed in claim 12, wherein the first limbs of the first and second side parts include front surfaces which are aligned with the front surface of the central part when the first and second side parts are in the non-supporting position to form a common front surface.

16. The head restraint as claimed in claim 15, wherein the second limbs of the first and second side parts include top surfaces which are aligned with the upper side of the central part when the first and second side parts are in the non-supporting position.

* * * * *